United States Patent [19]

LeClou

[11] 4,295,620
[45] Oct. 20, 1981

[54] DEVICE FOR ANCHORING A VESSEL IN A HORIZONTAL FOUNDATION RAFT

[75] Inventor: André LeClou, Saint Remy les Chevreuse, France

[73] Assignee: Commissariat a l'Energie Atomique, Paris, France

[21] Appl. No.: 12,730

[22] Filed: Feb. 16, 1979

[30] Foreign Application Priority Data

Feb. 17, 1978 [FR] France ............................ 78 04577

[51] Int. Cl.³ ............................................ A47G 23/02
[52] U.S. Cl. .................................. 248/154; 248/680; 376/461
[58] Field of Search ............... 248/679, 680, 154, 500; 176/83, 87; 122/510; 165/67, 68, 81, 82; 220/18

[56] References Cited

U.S. PATENT DOCUMENTS

| 2,773,755 | 12/1956 | Larsen | 248/154 X |
| 3,512,738 | 5/1970 | Galbarini et al. | 248/680 |
| 3,563,855 | 2/1971 | Marko | 176/87 X |
| 3,771,499 | 11/1973 | Marroni | 248/DIG. 1 |
| 3,792,795 | 2/1974 | Sikora | 220/18 |
| 3,851,626 | 12/1974 | Boyd et al. | 248/678 X |
| 4,101,288 | 7/1978 | Smith | 248/DIG. 1 |
| 4,115,194 | 9/1978 | Butti | 176/87 |
| 4,155,476 | 5/1979 | Lipiec | 220/18 X |

FOREIGN PATENT DOCUMENTS

| 1336803 | 7/1962 | France | 176/87 |
| 881790 | 11/1961 | United Kingdom | 176/87 |

Primary Examiner—J. Franklin Foss
Attorney, Agent, or Firm—Kerkam, Stowell, Kondracki & Clarke

[57] ABSTRACT

A vessel such as a nuclear reactor containment vessel is provided with a bottom extension in the form of a cylindrical skirt in which are formed peripheral openings in uniformly spaced relation. A horizontal cross-pin extends through each orifice, projects on each side of the cylindrical skirt and is provided with means for translational locking with respect to the orifice. The threaded upper portion of an anchor-bolt is mounted at each end of the cross-pin while the lower ends of the two bolts are anchored in the foundation raft. The device produces a substantial reduction of stresses in the anchorage zone.

3 Claims, 6 Drawing Figures

DEVICE FOR ANCHORING A VESSEL IN A HORIZONTAL FOUNDATION RAFT

This invention relates to a device for anchoring a vessel in a horizontal foundation raft.

In more exact terms, this invention relates to a device for anchoring the lower end of a leak-tight containment vessel constructed preferably of metal and having a flat base in a foundation raft which is preferably of concrete. Said foundation raft is provided with a central portion for supporting the flat base of said vessel and with an annular portion for receiving a portion of the anchoring device.

To be even more precise, the present invention relates to a device for making a connection between the foundation raft and the vessel while permitting dimensional variations of said vessel under the action of internal pressure or thermal expansions, for example, without introducing excessive stresses in the different parts of the vessel or of the anchoring device.

The vessels under consideration can be employed in particular in the nuclear field as containment vessels. Vessels of this type must be capable of withstanding a relatively high internal pressure in the event of an accident condition. Furthermore, the connection between said vessel and the foundation raft to which this latter is secured must be capable of withstanding accelerations due to earthquakes but must clearly not give rise to damage or degradation of the anchoring device. It must also be ensured that the anchoring device transmits all stresses or deformations to the vessel walls and not to the base of the vessel which must remain strictly flat.

French Pat. No. 1,336,804 filed on July 24, 1962 in the name of the present Applicant described a connecting device which was more especially applicable to the rigid attachment of a vessel to an anchoring raft. In order to gain a clearer understanding of the problems raised by this connection, FIG. 1 shows a veritcal sectional view of a device for anchoring a vessel in accordance with the patent cited above. The vessel 2 is limited by a lateral cylindrical wall 4, by a flat bottom wall or base 6 which is welded to said lateral wall and by a domical cover 8 which is also welded to the lateral wall 4. Said vessel may be provided if necessary with connecting nozzles such as the nozzle 10. Said vessel 2 is secured by means of an anchoring device to a foundation raft of concrete, for example. However, the foundation designated in the figure by the reference 12 could be of earth or of earth plus sand and the like. Said anchoring device consists of a certain number of anchor-bolts as designated by the reference 14; the lower end 16 of each bolt is anchored in the mass of the foundation raft 12 whilst the other end is threaded and is designated by the reference 18. The vessel 2 has an extension in the form of a cylindrical skirt 20 provided with a certain number of peripheral openings as designated by the reference 22. Said openings each provide sufficient space for a mounting element which is rigidly fixed to the threaded upper end of each anchor-bolt 14. The lower end of the cylindrical skirt 20 is welded to a horizontal annular flange 24 pierced with bores through which the threaded portions 18 of the anchor-bolts 14 are intended to pass. The vessel 2 is fixed on the foundation raft 12 by means of the anchor-bolts 14, the threaded portions 18 of which cooperate with nuts such as those designated by the reference 26. The flat base 6 of the vessel 2 rests on the central portion 28 of the foundation raft 12.

The anchoring device which has just been described makes it possible to prevent lifting of the vessel 2 in the event of accidental pressurization of said vessel. This design accordingly offers a solution to the problem and has many advantages. It does nevertheless suffer from one disadvantage in that internal stresses are developed throughout the structure when forces arising from pressure or earthquakes are applied to this latter. It can be understood in particular that the anchoring elements constituted by the anchor-bolts 14 act on the annular flange 24 which is in turn welded to the vessel extension formed by the cylindrical skirt 20. In consequence, these relatively large forces arise essentially at the level of the anchorage of the extension skirt in the foundation raft. As mentioned earlier, said forces can arise either from accidental pressurization of the vessel 2 or from earthquakes applied to the structure or from other mechanical actions. In addition, it proves necessary to provide openings in the cylindrical skirt, thus impairing the strength of the mechanical structure.

The precise aim of the present invention is to provide a device of the type described above for anchoring a vessel to a foundation raft which also has the structure described in the foregoing. Said device permits a very appreciable reduction in the stresses applied to the entire vessel structure under the action of mechanical forces. In particular, the device makes it possible to reduce these stresses at the level of the coupling between the extension skirt and the foundation raft.

The anchoring device essentially comprises n orifices formed at the lower end of the lateral wall of said vessel and uniformly spaced along its periphery and n mounting elements, each mounting element being constituted by a horizontal cross-pin extending through one of said orifices so that one end of said cross-pin is located inside said vessel and the other end is located outside said vessel and by two identical assemblies for anchoring said vessel in said foundation raft, each anchoring assembly being constituted by an upper end and a lower end, said upper end being intended to act on one of the ends of said cross-pin, said lower end being anchored in said foundation raft, said cross-pin being provided with means for translational locking with respect to said orifice.

A more complete understanding of the invention will in any case be gained from the following description of a number of embodiments of the invention which are given by way of example without any limitation being implied, reference being made to the accompanying drawings, wherein:

FIG. 1, already described, is a vertical sectional view of a vessel which is fixed on its foundation raft by means of a device in accordance with the prior art;

FIGS. 4 and 5 are views illustrating a method of anchoring of the vessel by means of rocker-arm devices, in which FIG. 4 is more specifically a vertical sectional view of a mounting element whilst FIG. 5 is a view in elevation showing rocker-arm mounting device;

Figure 1:
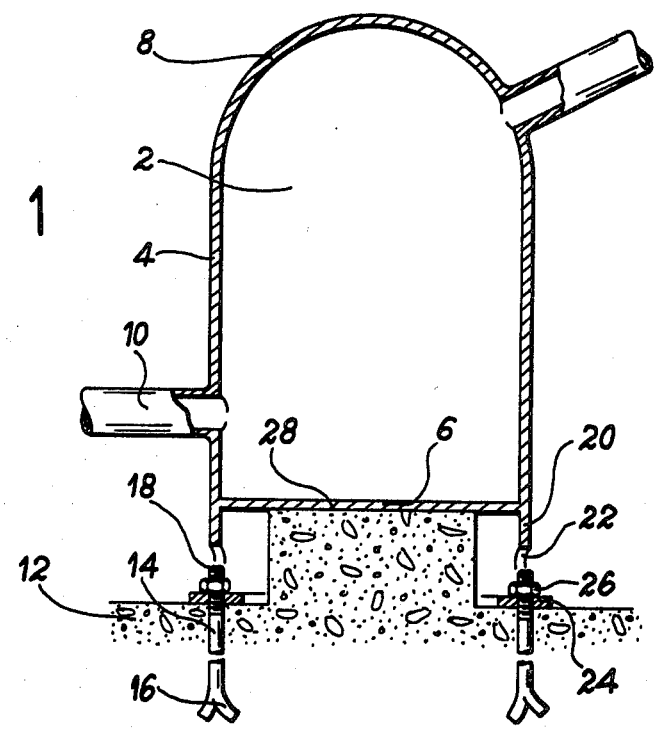

As stated in the foregoing, the present invention relates to a device in which a vessel of the type shown in FIG. 1 and described earlier is anchored to a foundation raft. This anchoring device essentially consists of a certain number of mounting elements which, in one embodiment, are all identical and uniformly spaced along the periphery of the bottom cylindrical skirt 20. In consequence, it is unnecessary to give a further illustration of the entire installation. As already mentioned, the coupling assemblies are each provided with a cross-pin having a horizontal axis which passes through a bore formed in the bottom cylindrical skirt 20 or vessel extension, said cross-pin being rigidly fixed to the foundation raft 12 by means of threaded rods. The various embodiments of the invention differ from each other in the form of coupling provided between said horizontal cross-pins and the cylindrical skirt 20 as well as in the type of coupling provided between the threaded anchor-bolts and the horizontal cross-pin.

In all the embodiments, the lower end of each anchor-bolt consisting of a rod or flat bar (designated by the reference 16 in FIG. 1) is anchored in the foundation raft 12. In consequence, the different figures representing the different embodiments will show only the threaded upper ends of the anchor-bolts since only said upper ends offer a original feature.

Figure 2:
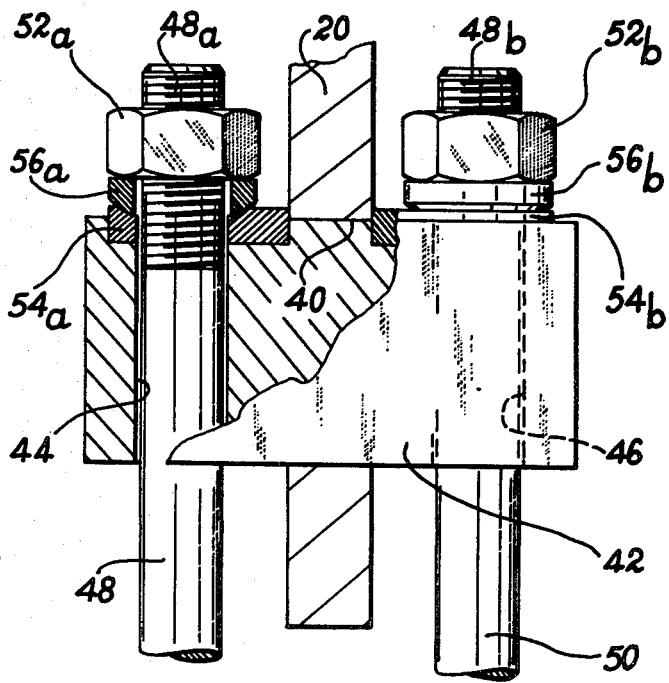
FIG. 2 is a first simplified embodiment of the anchoring device in accordance with the invention.

FIG. 2 illustrates the most straightforward embodiment. It has been seen above that the cylindrical skirt 20 is provided at the lower end with a bore 40 for each anchoring assembly. Said bore 40 is traversed by a cross-pin 42 which projects on each side of the cylindrical skift 20. Said cross-pin 42 is in turn provided with two vertical bores 44 and 46 for the insertion of two threaded rods 48 and 50, the upper ends 48a and 48b are threaded whilst the lower ends are anchored in the foundation raft 12. As mentioned earlier, a rigid connection between the cross-pin 42 and the foundation raft is made by means of the threaded rods 48 and 50 and more specifically by means of the cooperation between the anchor-bolts and the nuts 52a and 52b. The keys 54a and 54b have the function on the one hand of securing the cross-pin 42 against horizontal translational motion and on the other hand of constituting bearing members for the cylindrical washers 56 and 56' which are interposed between the nuts 52 and 54. It is understood that the interposition of domed washers 56a and 56b in each anchoring assembly serves to ensure correct clamping of the cross-pins 42 against the foundation raft even if the threaded rods 48 and 50 are not strictly vertical.

Figure 3:
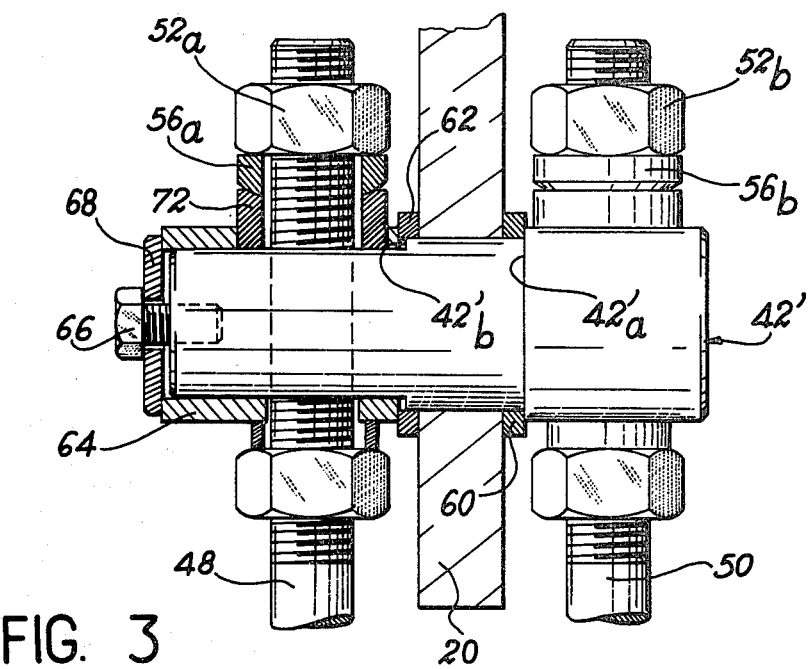
FIG. 3 shows a method of anchoring the vessel to the foundation raft by means of a ring.

There is shown in FIG. 3 a first alternative embodiment of the mounting element of FIG. 2 in which only the system of translational locking of the cross-pin is changed. The cross-pin 42' has two annular shoulders 42'a and 42'b. Rings 60 and 62 are placed around the cross-pin 42 on each side of the orifice 40, the ring 60 being applied against the annular shoulder 42'a. On the outside of the vessel, the cross-pin 42' is surrounded by a sleeve 64. Translational locking of the cross-pin 42' is ensured by means of the screw 66 and the plate 68. Said plate bears on one end of the sleeve 64, the other end of which is applied against the ring 62. As can readily be understood, the sleeve 64 is pierced by two orifices 70 and 70' in order to permit the insertion of the anchor-bolt 48. In addition, an annular spacer member 72 which surrounds the anchor-bolt 48 is interposed between the cross-pin 42 and the domed washer 56a in order to serve as a seating for this latter.

Figure 4:
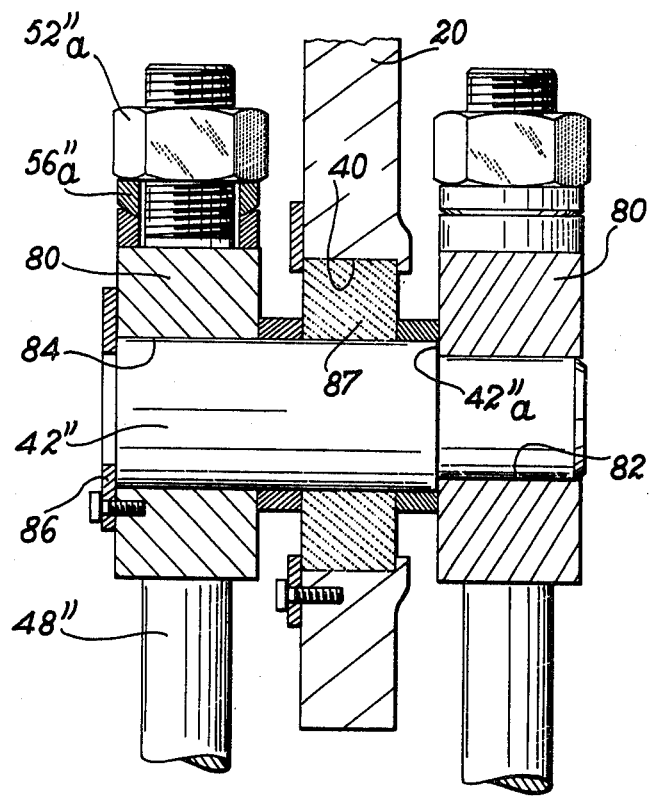
Figure 5:
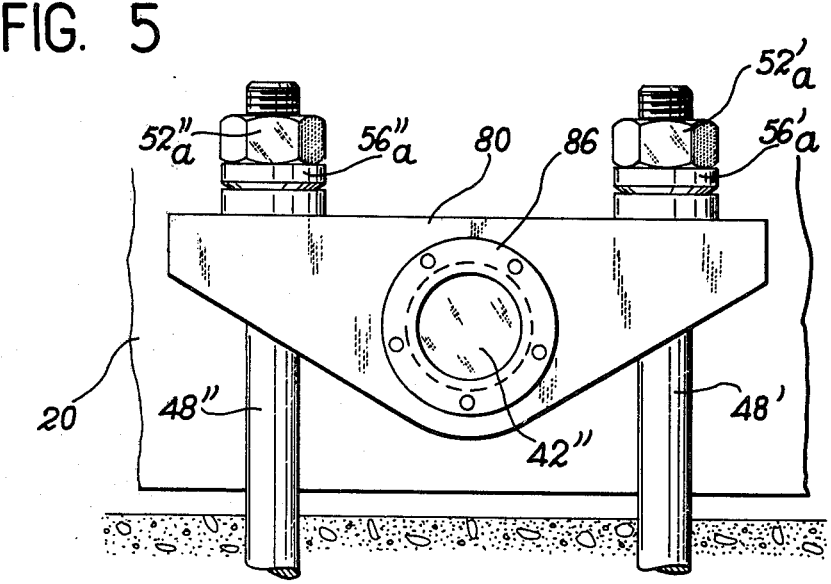

In the embodiment shown in FIGS. 4 and 5, the cross-pin 42" is mounted as a compensation bar or rocker-arm. Provision is accordingly made on each side of the wall for two identical devices each constituted by a cross-member 80 anchored in the ground by means of two anchor-bolts 48' and 48" associated with nuts 52"a and 52'a and with domed washers 56'a and 56"a. The cross-pin 42" is rotatably mounted at both ends within bores 82 and 84 formed in the cross-members 80. The cross-pin is secured against translational motion by the annular shoulder 42"a and by the retaining ring 86. The cross-pin is mounted within the bore 40 by means of the ring 87.

Figure 6:
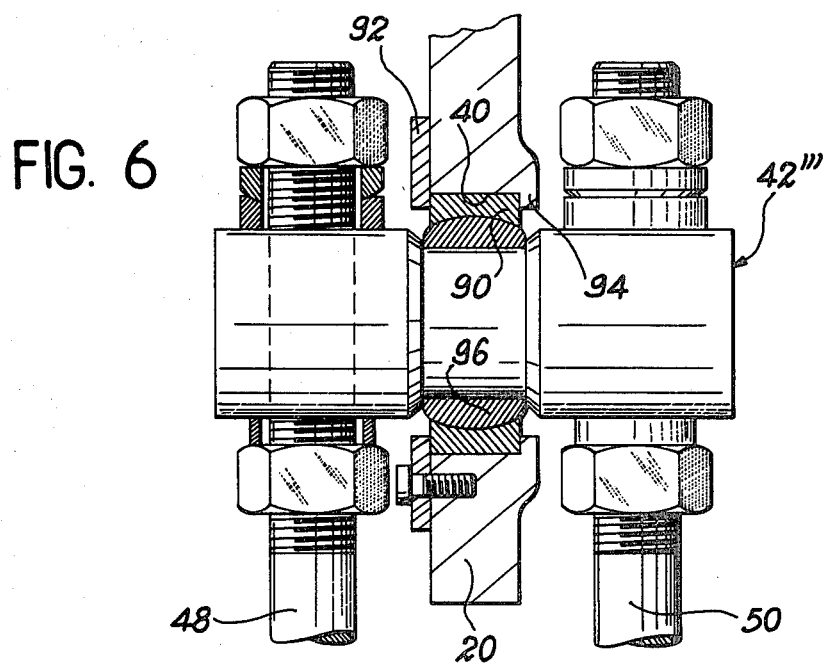
FIG. 6 shows one example of construction of a mounting element which is employed in the device and makes use of a knuckle-bearing system.

In the embodiment of FIG. 6, the cross-pin 42" is rotatably mounted within the bore 40 of the wall 20. To this end, the bore 40 is fitted internally with a spherical bearing 90 which is secured against translational motion (ring 92 and annular shoulder 94). That portion of the cross-pin itself which is engaged within the bore 40 is fitted with an external ring 96, the external surface of which constitutes a knuckle-bearing in cooperating relation with the spherical bearing 90. The ring 90 is secured against translational motion by annular shoulders formed in the cross-pin 42'''. The cross-pin 42''' is rigidly fixed to the foundation raft by means of anchor-bolts 48 which are identical with those of FIG. 3.

It is also worthy of note that the base 6 is provided with special arrangements in order to permit tightening of the inner nuts, that is to say the nuts 52b and 52'b and 52"b. These arrangements consist of an orifice formed about each nut, said orifices being subsequently sealed-off by means of plates which are screwed in position after tightening of the nuts.

What we claim is:

1. A device anchoring a cylindrical vessel having a vertical axis in a foundation raft, wherein said device comprises n orifices formed at the lower end of a lateral wall of said vessel and uniformly spaced along its periphery and n mounting elements, each mounting element being constituted by a horizontal cross-pin extending through one of said orifices so that one end of said element is located inside said vessel and the other end is located outside said vessel and by two identical assemblies for anchoring said vessel in said raft, each anchoring assembly being a rocker-arm system of two tie-bolts anchored in said foundation raft and by a cross-member in which one end of said horizontal cross-pin is rotatably mounted.

2. A device according to claim 1, wherein said horizontal cross-pin is rotatably mounted within the interior of the orifice formed in said lateral wall.

3. A device for anchoring a cylindrical vessel having a vertical axis in a foundation raft, wherein said device comprises n orifices formed at the lower end of a lateral wall of said vessel and uniformly spaced along its periphery and n mounting elements, each mounting element being a horizontal cross-pin extending through one of said orifices with one end of said element located inside said vessel and another end of said element located outside said vessel and by two identical assemblies for anchoring said vessel in said raft, each anchoring assembly comprising an anchor-bolt having a vertical axis and a lower end of said anchor bolt is anchored in said foundation raft and an upper end of said anchor bolt is threaded and passes through a bore in one end of said cross-pin, and a nut mounted on said threaded upper end, said nut being applied against said cross-pin by a domed washer, said cross-pin being provided with means for translational locking with respect to said orifice.

* * * * *